Reissued July 27, 1926. Re. 16,396

UNITED STATES PATENT OFFICE.

ALAN KISSOCK, OF FOREST HILLS, NEW YORK.

PROCESS OF MAKING ALLOY STEEL.

No Drawing. Original No. 1,300,279, dated April 15, 1919, Serial No. 251,750, filed August 28, 1918. Application for reissue filed June 4, 1926. Serial No. 113,810.

The invention relates to a process of making alloy steel, and the object and advantages thereof will be set forth in part hereinafter, and in part will be obvious herefrom, or may be learned by practice with the invention.

The invention consists in the novel steps and processes herein described.

In the manufacture of steel, alloyed particularly with molybdenum, the usual practice is to add or introduce into the fused steel the molybdenum in the elemental form or in the form of a high grade alloy of molybdenum, usually with iron, known as the ferro state, or ferro-molybdenum. This involves as a preliminary step, in order to obtain the molybdenum in the elemental or ferro state, the reduction of the ores or salts of molybdenum to the metallic form, this being usually done in an electric or other suitable furnace.

The oxides of molybdenum combine with the oxides of certain other elements, more especially with certain of the alkali metals and the alkaline-earth metals, of which calcium oxide may be regarded as an example, to form a salt of the general type known as molybdate of calcium or other such element. In the case of these particular elements just enumerated these salts would be of the general form $CaOMoO_3$.

At the present time, I prefer to employ the salts of calcium, molybdenum being the constituent element of the salt which reduces to produce the alloying metal for the steel. These salts of calcium can be produced from the ores of molybdenum without the use of furnacing, and often these salts are necessarily produced in the ore-reduction process. That is, the ferro state may be obtained or produced by furnace reduction of their calcium salts which have in turn been produced from the ores.

The present invention obviates the preliminary or preparatory reduction of the ores or salts of molybdenum to the metallic state, and provides for introducing the alloying molybdenum directly from the salt thereof into the steel.

The procedure under my present method is essentially that instead of reducing the ores of molybdenum to the metallic state in an outside furnace, and then introducing such alloying element into the molten steel, the calcium salt of molybdenum is added directly into the steel melting furnace. The carbon content of the steel and its bath, which carbon is actually a previous alloy of the steel, reduces the calcium salt of the molybdenum, the so reduced molybdenum alloying directly with the steel. If desired other carbon may be added to, or substituted for, the carbon content of the steel and its bath. The calcium oxide which is a constituent of the salt fixes the molybdenum and prevents its volatilization, thus avoiding loss, and presents the molybdenum capable of alloying directly with the steel in the melting furnace. Some suitable reducing agent other than carbon, such as silicon, which also may be a previous alloy of the steel, may be employed in the melting furnace. There are thereby eliminated the outside reduction of the ores or salts of molybdenum, with the attendant time, cost and labor, and large furnace losses of this costly element are likewise avoided.

What I claim is:—

1. The process of making alloy steel which comprises reducing calcium molybdate at furnace temperature in the presence of fused steel by means of carbon as a reducing agent whereby the reduced molybdenum is caused to enter the steel.

2. The process of making alloy steel which comprises reducing calcium molybdate at furnace temperature in the presence of fused steel whereby the reduced molybdenum is caused to enter the steel as an alloy.

3. The process of making molybdenum alloy steel which comprises reducing a salt of molybdenum by introducing the salt directly into the steel melting furnace during the steel making process and reducing the salt by the action of a constituent of the molten steel in the furnace, whereby the molybdenum is reduced directly from its salt and immediately enters the steel.

4. The process of making alloy steel which comprises reducing a calcium salt of molybdenum by subjecting the salt to furnace temperature in the presence of fused steel by the carbon or silicon content of the steel and its bath employed in the steel process acting directly upon the salt whereby the molybdenum is reduced from the salt and directly enters the steel as an alloy.

In testimony whereof, I have signed my name to this specification.

ALAN KISSOCK.